Aug. 20, 1935. P. CARPENTER 2,011,567
CAMERA
Filed May 24, 1924   2 Sheets-Sheet 1
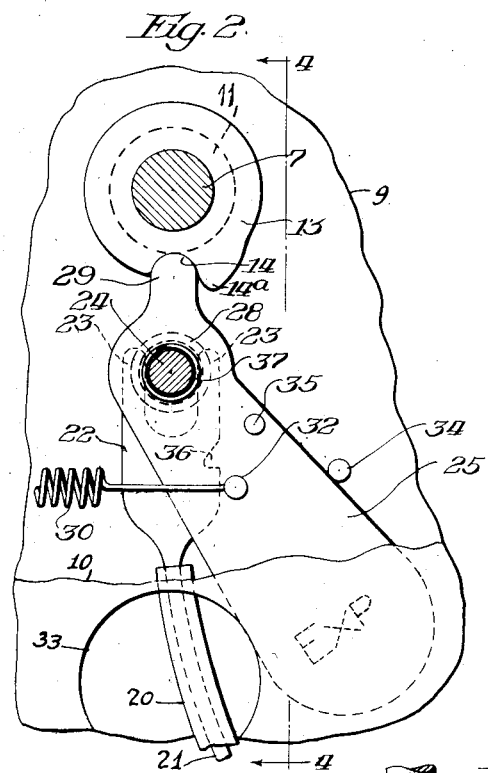
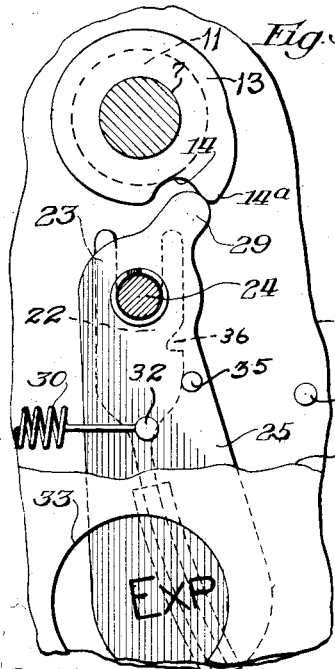
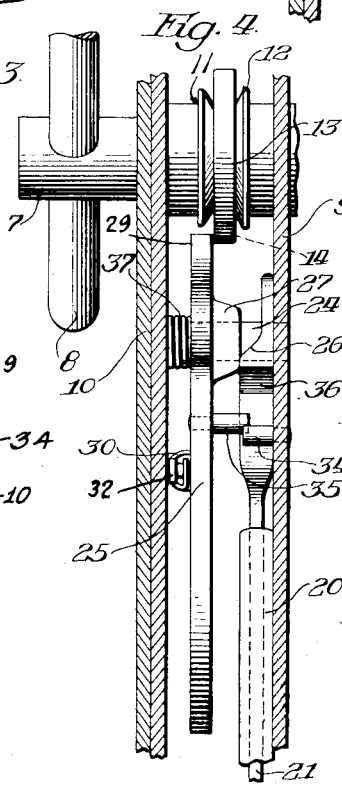
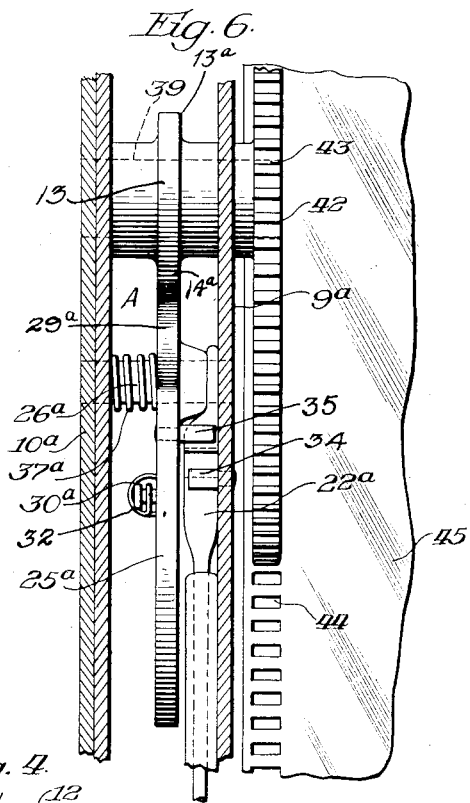
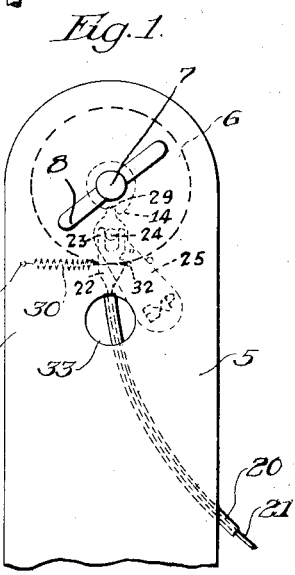

Aug. 20, 1935.  P. CARPENTER  2,011,567
CAMERA
Filed May 24, 1924  2 Sheets-Sheet 2

Witness:

Inventor:

Patented Aug. 20, 1935

2,011,567

UNITED STATES PATENT OFFICE 2,011,567

CAMERA

Paul Carpenter, Chicago, Ill.

Application May 24, 1924, Serial No. 715,592

13 Claims. (Cl. 95—32)

This invention relates in general to the art of photography, and more particularly to improvements in cameras, and, while for the purposes of convenience in description, the invention is illustrated as employed in connection with a conventional form of folding camera, employing a continuous strip of sensitized material on increments of which photographic negatives are consecutively made as the strip is manually advanced for exposure at the will of the operator, it will be understood that the invention is contemplated as being applicable to cameras employing so-called plate negatives, and film packs, and to other available mechanisms wherein this invention may be employed, and therefore the invention finds a wide field of utility for purposes in addition to that specifically described here.

It is well known to those skilled in the art that in connection with the so-called portable or hand camera, particularly those types employed by amateur photographers and in which either a roll of film or a film pack or plate negative is employed, the user often either overlooks the fact that a section of the film, (or a plate,) has already been exposed and through inadvertence re-exposes the film and so superimposes another picture on the picture already taken, or conversely in his anxiety to avoid this mishap often wastes material by treating it as if it had already been exposed and so finds a "blank" when the film is developed. This is a common occurrence in the cameras which employ a film strip (as well as those which employ a plate) and moreover often in the cameras which employ a roll film the operator in moving the film subject to an exposure to bring another portion thereof into position for exposure will move the film too far, thus entailing an over-lapping of the exposures.

The present invention is intended and in its embodiment has been designed to obviate these difficulties and to this end the principal objects and advantages which characterize this invention are found to reside in the provision of a camera having means for preventing an involuntary double exposure of the light sensitive element; the provision of a camera having improved means for indicating the condition of the light sensitive element; the provision of a camera having improved means for preventing accidental non-exposure of the light sensitive element or a part thereof; the provision of an improved means for preventing feeding of a film strip more than a predetermined distance subsequent to an exposure thereof; the provision of improved means for preventing accidental movement of the light sensitive element prior to exposure and also preventing an accidental double exposure of said light sensitive element. More specifically, the object of the present invention is to prevent accidental double exposure of a film section, while permitting an intentional reexposure of such section if desired, and to prevent accidental feeding of the unexposed film section, by so interlocking the shutter and the film winding mechanism that after exposure of a given film section, the exposed section must be wound at least partly out of exposure position before the shutter can be normally reoperated, although it may be released for intentional reoperation if desired.

This invention further has for its additional objects the provision in a camera of a plurality of indicators, one of which indicates the position of the light sensitive element and another of which indicates the condition of said element; and means controlled by said indicator for preventing a double exposure of the light sensitive element.

Still further objects and advantages of this invention reside in the provision of a camera which indicates a light sensitive element and a shutter or other exposure apparatus, and means for limiting movement of the light sensitive element to a predetermined distance subsequent to exposure; the provision in a camera of improved means for indicating the condition of the light sensitive element, and an exposure apparatus controlled by said indicator; the provision, in a camera, of means for indicating the condition of the light sensitive element, means for feeding the light sensitive element, and means for limiting the movement of the light sensitive element; and the provision, in a camera of improved means for indicating the condition of the light sensitive element, and means for feeding said element which is governed by the position of said indicating means.

The foregoing and such other objects and advantages as may appear or be pointed out as this description proceeds are attained in the structural embodiments of my invention illustrated in the accompanying drawings, in which Figure 1 is an elevational view of a portion of a camera illustrating one form of this invention;

Figure 2 is an enlarged elevational view of the indicating device and lock;

Figure 3 is a view similar to Figure 2 showing the indicator in a different position;

Figure 4 is a vertical sectional view taken on the line 4—4 of Figure 2 looking in the direction indicated by the arrows with the shutter 25 in the position shown in Figure 3;

Figure 6 is a vertical enlarged view of Figure 5 with the casing shown in section along line 6—6 looking in the direction indicated by the arrows.

Figure 5:
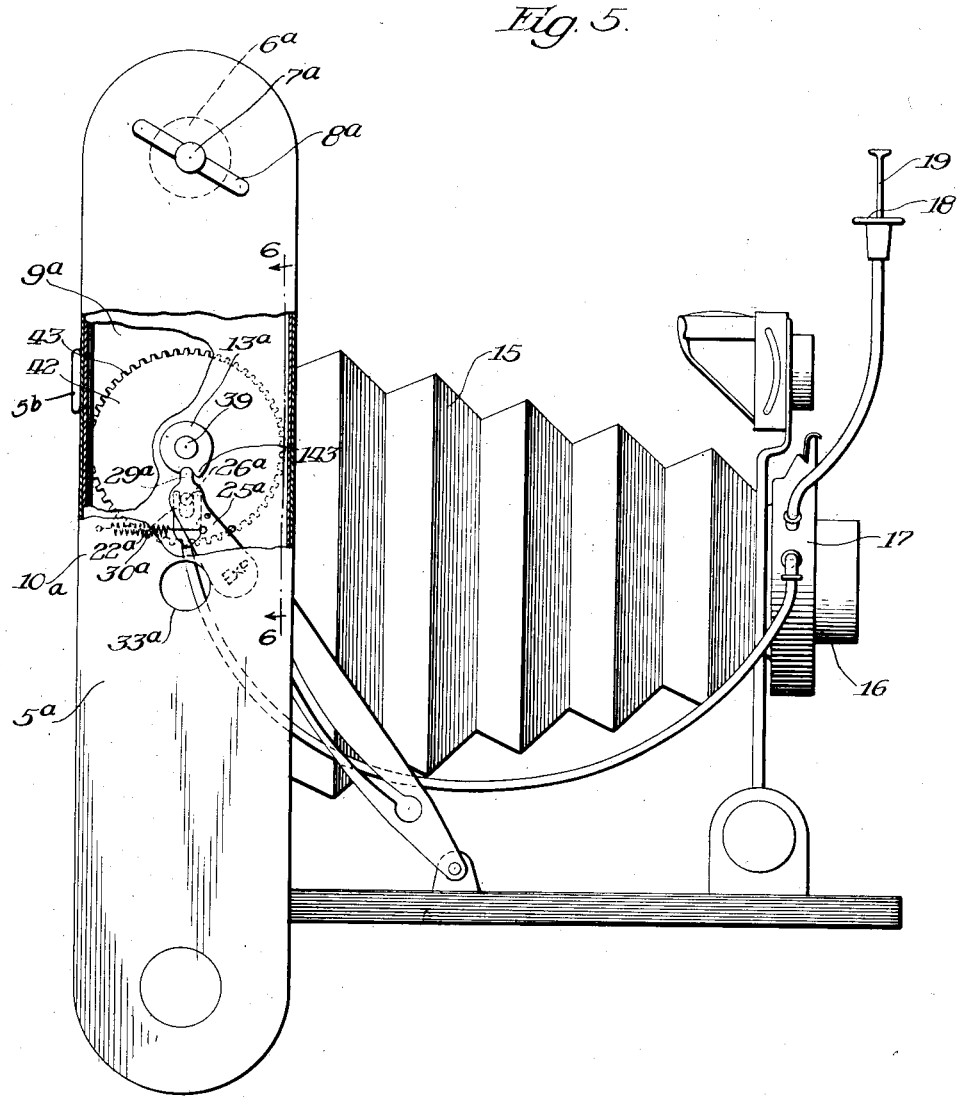
Figure 5 is an elevational view of the camera having another form of the invention.

Referring more particularly to the drawings, and first to the embodiment shown in Figures 1 to 4, the body or case 5 of a folding camera of the type shown in Figure 5 is shown in Figure 1, and it will be assumed for the purposes of this description that a roll film (not shown) is contained in said case 5 and is wound onto a spool or reel 6 from another spool or reel (not shown) at the opposite end of the case.

The reel 6 is operated by the conventional form of winding shaft 7 provided with a key 8, by which said shaft may be rotated and a conventional ratchet or clutch (not shown) for preventing reversal of said shaft may be included. The shaft is adapted to detachably connect in the conventional way with the reel 6 so that the latter may be removed when the film is wound thereon.

For the purposes of this invention I provide, if not already in the camera case, an auxiliary wall 9 spaced from the main end wall 10, and on the shaft 7 between said walls I provide frictional clutches 11 and 12 between which is mounted a disc 13 normally firmly gripped by said clutches, but adapted at times to slip relatively to the clutches and said shaft 7. The disc 13 is provided with a radial recess 14 of a predetermined depth best suited for the purposes which will hereinafter appear.

As will be readily understood, the camera, of which the case 5 forms a part, is equipped with the bellows 15 as shown in Figure 5, lens 16, shutter mechanism 17 and a shutter operating member 18 which usually includes a rectilinearly movable flexible member 19 which is adapted to be pressed by the finger of the operator for operating the shutter.

Reverting to Figure 1, there is provided a flexible motion transmitting element 20 similar to the member 18 and as shown in Figure 5, extending from the shutter operating mechanism to the mechanism of this invention.

The flexible member 20 includes a flexible casing containing a flexible wire or the like 21 and said flexible wire is provided on its inner end adjacent the winding shaft 7 with a fork member 22. The fork member may be attached in any suitable manner to the wire 21 and the arms 23—23 of said fork member embrace a transverse pin 24 spaced from the shaft 7 and on which the indicator blade 25 is pivotally and slidably mounted.

The fork member, as will best be seen from an inspection of Figure 4, has the arms 23 thereof formed with an enlarged shoulder portion 26 common to both of said arms and adapted to engage with an enlarged abutment 27 formed on the inner surface of the indicator blade 25 at the axis thereof so that when the fork member is slidably displaced along the wall 9, the enlargement of said arms thereof will enter between said wall and said abutment 27 and displace the indicator to the left as viewed in Figure 4 along said shaft 24.

The hub 28 of the indicator 25 is provided with a radially extending lug 29 angularly related to the longitudinal axis of the blade 25 but in substantially the same plane therewith and adapted to engage in the recess 14 as shown in Figure 2.

A helical contractile spring 30 is anchored at 31 inside the case 5 and is connected at 32 to the blade 25 of the indicator and tends to draw said blade downwardly to the left as viewed in Figure 3 to bring the lower end of the blade into exposed position in the sight opening 33 formed in the outer wall 10 of the case 5. Movement of the blade in the other direction is limited by a stop member 34 and, as will hereinafter appear, this movement is brought out by engagement of the lug 29 in the notch or recess 14.

In order to lock the shutter mechanism against operation at predetermined times, as will hereinafter appear, a pin 35 is provided on the blade 25 of the indicator and is adapted to engage in a complementally formed notch 36 in one edge of the fork member.

An expansion helical spring 37 surrounds the pin 24 and normally tends to force the indicator member into the position shown in Figure 4, so that when said member is displaced laterally on the pin 24 by movement of the fork member this is done against the tension of the spring 37.

In the operation of this device, assuming that a film has been introduced into the camera and wound into position for exposure of a section thereof, the rotating of the shaft 7 carries with it the clutch members 11 and 12 and the disc 13, and this rotating of the disc takes place until the recess 14 engages the lug 29, thereby displacing the indicator until it engages the stop 34 whereupon the disc 13 slips in the clutches 11 and 12 and the spool 6 continues to rotate until the operator has brought the desired section of film into position for exposure, this being determined in the usual way by the provision of a sight opening 5b in the back of the camera case through which a number appears which is printed on a paper strip enclosing the film.

This displacement of the indicator permits operation of the exposure means, that is, the shutter mechanism when desired. As soon as this shutter mechanism is operated, and simultaneously therewith, the fork member 22 is forced upwardly as viewed in Figures 2 and 4 so that the indicator is laterally displaced on the pin 24 as shown in Figure 4. This movement disengages the lug 29 from the recess 14 and permits the spring 30 to pull the indicator down into position to indicate that an exposure has been made. Upon release of pressure on the member 19, the fork is retracted and the pin 35 enters the notch 36 in the fork member 22 and thereby prevents another operation of the shutter mechanism before the exposed portion of the film has been moved onto the spool 6.

The operator then winds the film section onto the spool until the next number appears in the sight opening at the rear of the camera case in the usual way, but during this operation and up to a predetermined point, the disc 13 is again rotated until the recess 14 therein again engages the lug 29, whereupon the indicator is moved to the right position shown in Figure 2, simultaneously releasing the shutter mechanism for another exposure.

It will be observed from an inspection of Figures 2 and 3 that the disc 13 is provided adjacent to one side of the notch 14 with an enlarged portion 14a, and the reason for provision of this enlargement is that when the disc rotates it is necessary that the disc bring the lug 29 into the recess and this is accomplished by the enlargement 14a coming around and engaging the lug 29 as may best be seen from an inspection of Figure 3.

Referring now to the form of the invention shown in Figures 5 and 6, the function of this form of the device is to accomplish everything that the device of Figures 1 to 4 accomplishes and in addition to prevent movement of the film beyond a predetermined point and also to prevent accidental non-exposure as well as accidental exposure of the light sensitive element such as a film.

To this end, there is provided on the winding shaft 7a, a slip clutch 6a of any suitable design which will offer sufficient gripping action between the shaft 7a operated by its handle 8a and the spool onto which the film is to be wound.

At a desired point in the casing 5a between the inner and outer walls 9a and 10a thereof I provide controlling and indicating mechanism generally designated A which is substantially identical with the structure shown in Figures 1 to 4 with certain exceptions which will appear.

The indicator blade 25a is mounted on a pin 26a and displaced against the tension of a spring 37a by means of a fork member 22a and is actuated into indicating position by the provision of a spring 30a. The indicator is provided with a lug 29a whch is adapted to engage the disc 13a, which latter is mounted on an auxiliary countershaft 39 mounted in suitable bearings in the walls 9a and 10a and to which shaft the disc 13a is fixedly secured, as will hereinafter appear. Obviously, where available space demanded, a necessary reduction gearing might be substituted.

On the inner end of the shaft 39 there is mounted a film engaging wheel 42 adapted to rotate with the shaft and provided with a circumferential series of teeth or pins 43, depending upon which is desired, said teeth 43 being adapted to engage in a series 44 of notches provided along the edge of the film strip 45. These notches need not be formed in the film itself but may be in the paper strip which usually accompanies the film and to which the film is attached.

In this form of the invention the operation is such that accidental non-exposure is prevented, accidental double exposure is prevented and, in addition, movement of the film section too far is also prevented.

In operation, assuming the parts to be in the position shown in Figures 5 and 6, and a film section in place for exposure, the shutter mechanism is actuated by means of the member 19 which simultaneously forces the fork member 22a upwardly and by virtue of its engagement with the indicator 25a moves said indicator to the left as viewed in Figure 6, exposes the film to take a picture and simultaneously, by means of the spring 30a, indicates that such an exposure has been made.

The operator now winds that section of the film onto the spool operated by the shaft 7a and when the lug 29a again engages the enlargement 14b on the disc 13a the indicator 25a is moved away from the sight opening 33a and the lug on said indicator stops the toothed wheel 42. This arrests movement of the film and even though the operator does continue to rotate the shaft 7a the clutch 6a slips and prevents tearing of the film.

In the event of a time exposure, it will be understood that in the conventional form of shutter here shown generally, the first operation of the member 19 does not permit a complete retraction of the fork member 22 and 22a, and consequently the pin 35 does not lock the shutter against operation for closing the shutter after opening for such an exposure, and only locks the shutter after the second impulse has been imparted to member 19 for closing the shutter at which time member 19 fully returns to its initial position.

Figure 7:
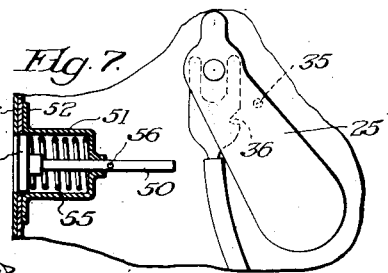
Figure 7 is a detail view of an alternative form of this invention.

In some instances it may be desirable to make a voluntary double exposure such, for instance, in the event that a single snap exposure would not be sufficient and where a time exposure is not desired. Referring to Figure 7 it will be observed that I have provided a plunger rod 50 slidably mounted in a bracket 51 which may be cylindrical and secured at 52 to rear wall 53 of the camera case. The outer end of the plunger carries a finger piece or button 54 which slides in the tubular bracket 51, and a helical spring 55 surrounds the rod 50 within said bracket between the inner end thereof and said button and normally tends to force the rod outwardly, such outward movement being limited by the pin 56. It will be observed that when it is desired to take a double exposure pressure may be applied to the button 54 which moves the inner end of the rod 50 to a position that when the indicator 25 drops to indicate an exposure it cannot drop far enough to cause the pin 35 to engage in the notch 36, and thereby permits of a voluntary double exposure.

Having thus described my invention and illustrated its use, what I claim as new and desire to secure by Letters Patent is:

1. In a camera, means for feeding a film strip, a shutter and means for operating said shutter, means for indicating the condition of the film including a reciprocating member operated by the means for operating the shutter, a target member forming a disconnectible connection between said reciprocating member and said film feeding mechanism, and means for laterally displacing said target for rendering same inoperative.

2. In a camera, means for feeding a film strip, a shutter and means for operating said shutter, means for indicating the condition of the film including a reciprocating member operated by the means for operating the shutter, and a target member forming a link between said reciprocating member and an element movable with said film, and said reciprocating member having means thereon for sliding said link for permitting winding of the film.

3. In a device of the character described, the combination with a camera having a film moving means, and a shutter mechanism, of an indicator having connection with said film moving means, means operated by the shutter mechanism for displacing said indicator for disconnecting it from the film moving means, and means on said indicator for locking said shutter mechanism.

4. In a device of the character described, the combination with a camera having a film moving means, and a shutter mechanism, of an indicator, a positive operating connection between the film moving means and the indicator, and means operated by said shutter mechanism for disconnecting the indicator from said film moving means.

5. In a device of the character described, in combination with a camera having a film moving mechanism, and shutter operating mechanism, of an auxiliary motion imparting element connected to said shutter operating mechanism, an indicator detachably connected to and operable with said film moving mechanism, and said motion imparting element acting on said indicator for disconnecting same from said film moving mechanism.

6. In a device of the character described, in combination with a camera having a film moving means and a shutter mechanism, of an indicator movable to one of its positions by positive engagement with said film moving means when an increment of film is moved into position for exposure, said shutter mechanism having an extension which displaces said indicator to another of its positions when an exposure is made, and means on said indicator for locking said shutter mechanism.

7. In a device of the character described, in combination with a camera having a film moving means and a shutter mechanism, of an indicator movable to one of its positions by positive engagement with said film moving means when an increment of film is moved, said shutter mechanism having an extension which displaces said indicator to another of its positions when an exposure is made, and a projection on said indicator for engagement with said extension for locking said shutter mechanism.

8. In a device of the character described, in combination with a camera having a film moving means and a shutter mechanism, of an indicator movable to one of its positions by positive engagement with said film moving means when an increment of film is moved, said shutter mechanism having an extension which displaces said indicator to another of its positions when an exposure is made, and means on said indicator for locking said shutter mechanism, and means for rendering said indicator inoperative as a lock on said shutter mechanism.

9. In a camera, a shutter mechanism including a member necessarily movable in effecting an exposure, and means for locking said member against movement, said locking means comprising a flexible elongated member having one end thereof connected to said first member and movable therewith under a compressional force, and means associated with the other end of said elongated member for locking the same against movement under a compressional force.

10. In a camera, a shutter mechanism including a member necessarily movable in one direction in effecting an exposure, and means for locking said member against such movement, said means comprising a flexible elongated motion transmitting member having one end thereof connected to said first member whereby movement of said one member in said one direction applies a compressional force upon said elongated member to effect linear movement of said elongated member in one direction, and means associated with the other end of said elongated member for releasably locking the other end of said elongated member against movement under a compressional force.

11. In a camera including a body portion having a dark space, a shutter support adjustable relative to the body, and an extensible bellows connecting the body with the shutter support, the combination of shutter mechanism carried by the body and including a member necessarily movable in one direction to effect an exposure, an elongated flexible motion transmitting member having one end thereof connected with said first member, whereby motion of said first member in said one direction applies a compressional force upon said elongated member to effect linear movement of said elongated member in a corresponding direction, and means associated with the other end of said elongated member and mounted upon the body for releasably locking the same against movement under a compressional force.

12. In a camera having a body portion adapted to hold a movable film, releasable locking means comprising a roller carried by the body and having its peripheral surface adapted to engage the film, whereby movement of the film causes rotation of the roller, a thrust transmitting member mounted for movement relative to the roller, an abutment surface, means for positioning said member to engage with the abutment surface whereby movement of the same is restricted, and means operative upon rotation of the roller for displacing said member so as not to engage with the abutment surface upon movement of the same.

13. In a camera having a body portion adapted to hold a movable film, releasable locking means comprising a roller carried by the body and having its peripheral surface adapted to engage the film, whereby movement of the film causes rotation of the roller, an elongated thrust transmitting member mounted on the body for movement in the direction of its length, means operative upon movement of said member from one position to a second position, and then back to the first position, to restrict said member against movement of the same toward said second position, and means operative upon rotation of the roller for enabling said member to again move towards said second position.

PAUL CARPENTER.